US008744623B2

(12) United States Patent
Drake et al.

(10) Patent No.: US 8,744,623 B2
(45) Date of Patent: Jun. 3, 2014

(54) TIMED DISPENSER AND AUDIT SYSTEM

(75) Inventors: Deborah L. Drake, Arden Hills, MN (US); Sherri L. Tischler, Inver Grove Heights, MN (US); Paul R. Kraus, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 190 days.

(21) Appl. No.: 13/116,878

(22) Filed: May 26, 2011

(65) Prior Publication Data

US 2012/0303159 A1 Nov. 29, 2012

(51) Int. Cl.
*G06F 17/00* (2006.01)

(52) U.S. Cl.
USPC .......................................... 700/244; 700/236

(58) Field of Classification Search
USPC ................................................ 700/236, 244
See application file for complete search history.

(56) References Cited

U.S. PATENT DOCUMENTS

| | | | | |
|---|---|---|---|---|
| 3,885,987 | A | 5/1975 | Keister et al. | |
| 4,467,961 | A | 8/1984 | Coffee et al. | |
| 4,671,435 | A | 6/1987 | Stout et al. | |
| 4,991,755 | A | 2/1991 | Grusmark | |
| 5,205,306 | A | 4/1993 | Peterson | |
| 5,535,775 | A | 7/1996 | Blaine | |
| 5,731,526 | A | 3/1998 | Kindrick | |
| 5,746,348 | A | 5/1998 | Bloom | |
| 6,103,003 | A | 8/2000 | Ledbetter | |
| 6,805,072 | B1 | 10/2004 | DeSano | |
| 6,820,821 | B2 | 11/2004 | Linstedt et al. | |
| 7,382,692 | B1 | 6/2008 | Hildebrandt | |
| 7,407,624 | B2 | 8/2008 | Cumberland et al. | |
| 7,515,507 | B2 | 4/2009 | Nanda | |
| 7,516,967 | B2 | 4/2009 | Schwei et al. | |
| 7,594,480 | B2 | 9/2009 | Cressy | |
| 7,812,730 | B2 * | 10/2010 | Wildman et al. | 340/573.1 |
| 8,294,584 | B2 * | 10/2012 | Plost | 340/573.1 |
| 2005/0127204 | A1 | 6/2005 | Linstedt et al. | |
| 2005/0224596 | A1 | 10/2005 | Panopoulos | |
| 2006/0078461 | A1 | 4/2006 | Kaplan | |
| 2008/0063561 | A1 | 3/2008 | Van Hooser | |
| 2008/0083793 | A1 | 4/2008 | Swain | |
| 2008/0178412 | A1 | 7/2008 | Kiter | |
| 2009/0108034 | A1 | 4/2009 | Bechyne et al. | |
| 2009/0189759 | A1 * | 7/2009 | Wildman et al. | 340/539.12 |
| 2010/0164728 | A1 * | 7/2010 | Plost | 340/573.1 |
| 2010/0315243 | A1 * | 12/2010 | Tokhtuev et al. | 340/603 |
| 2010/0315244 | A1 * | 12/2010 | Tokhtuev et al. | 340/603 |
| 2010/0332022 | A1 * | 12/2010 | Wegelin et al. | 700/231 |
| 2011/0068930 | A1 * | 3/2011 | Wildman et al. | 340/573.1 |
| 2011/0121974 | A1 * | 5/2011 | Tenarvitz et al. | 340/573.1 |
| 2011/0163870 | A1 * | 7/2011 | Snodgrass | 340/539.11 |

FOREIGN PATENT DOCUMENTS

| | | | |
|---|---|---|---|
| FR | 2697164 | A1 | 4/1994 |
| WO | 2006136608 | A3 | 12/2006 |
| WO | 2007120770 | A1 | 10/2007 |
| WO | 2007136611 | A3 | 11/2007 |
| WO | 2010101929 | A2 | 9/2010 |

* cited by examiner

*Primary Examiner* — Michael K Collins
(74) *Attorney, Agent, or Firm* — Shumaker & Sieffert, P.A.

(57) ABSTRACT

A chemical product dispenser includes one or more timing features. The chemical product may include cleaning, sanitizing, disinfecting, or other chemical products typically dispensed using a conventional spray bottle or other chemical product applicator used in the cleaning industry. The timed dispenser includes a timer and one or more indicators that are activated when one or more predetermined periods of time (such as a contact time or cure time) have elapsed. A timed dispenser audit system further monitors and analyzes use of the timed dispensers throughout one or more facilities, and may generate reports based on the analysis.

22 Claims, 9 Drawing Sheets

TIMED DISPENSER AND AUDIT SYSTEM

TECHNICAL FIELD

This disclosure relates to chemical product dispensing.

BACKGROUND

Cleaning, sanitizing and disinfecting agents, generically cleaning agents, are often used in the cleaning of various surfaces. The frequency of use and quantities of these chemicals used may be especially large in high traffic environments, for example hotels. During typical use, cleaning agents may be deposited on the surface to be cleaned and then may be wiped or scrubbed away. The proper use of these cleaning agents often includes letting the cleaning agent rest on the surface being cleaned for a recommended minimum time, the contact time. Removal of the cleaning agent before the contact time elapses may result in the inadequate sanitizing or cleaning of the surface and waste of the cleaning agent.

SUMMARY

In general, the disclosure relates to chemical product dispensers having one or more timing features. The timed dispenser determines when one or more predetermined periods of time from an actuation of the timed dispenser have elapsed. In another example, a timed dispenser audit system may monitor and analyze use of the timed dispensers throughout one or more facilities, and may generate reports based on the analysis.

In one example, the disclosure is directed to a system, comprising a plurality of timed dispensers, each timed dispenser comprising a container configured to hold a chemical product to be dispensed, a dispense mechanism that when actuated results in dispensation of the chemical product from the container, an actuation sensor configured to detect actuation of the dispense mechanism and generate a corresponding dispenser actuation signal, a timing module that receives the dispenser actuation signal and measures a predetermined period of time from receipt of the actuation signal, an indicator that is activated under control of the timing module when the predetermined period of time has elapsed, and a memory that stores dispenser actuation data, wherein the dispenser actuation data includes a count of dispenser actuations, time and date stamps associated with each dispenser actuation, and timed dispenser identification information, and a computing device that receives actuation data corresponding to each of the plurality of timed dispensers, the computing device comprising an analysis application that analyzes the actuation data received from each of the plurality of timed dispensers, and a reporting application that generates reports that characterize timed dispenser usage based on analysis of the actuation data.

In another example, the disclosure is directed to a method, comprising detecting a dispenser actuation of a dispense mechanism of a container configured to hold a chemical product to be dispensed, generating a dispenser actuation signal corresponding to the detected dispenser actuation, measuring a predetermined period of time from receipt of the dispenser actuation signal, activating an indicator when the predetermined period of time has elapsed, storing dispenser actuation data including a count of detected dispenser actuations, time and date stamps associated with each dispenser actuation, and timed dispenser identification information, analyzing the dispenser actuation data, and generating one or more reports that characterize timed dispenser usage based on analysis of the actuation data.

In another example, the disclosure is directed to a method, comprising detecting one or more dispenser actuations of a dispense mechanism of a container configured to hold a chemical product to be dispensed, generating a dispenser actuation signal corresponding to each of the detected dispenser actuations, counting dispenser actuations upon receipt of each dispenser actuation signal, measuring a predetermined period of time from receipt of each dispenser actuation signals, activating an indicator when the predetermined period of time has elapsed, storing dispenser actuation data including a count of detected dispenser actuations, time and date stamps associated with each dispenser actuation, and timed dispenser identification information, analyzing the dispenser actuation data, and generating one or more reports that characterize timed dispenser usage based on analysis of the dispenser actuation data.

The details of one or more examples are set forth in the accompanying drawings and the description below. Other features and advantages will be apparent from the description and drawings, and from the claims.

BRIEF DESCRIPTION OF DRAWINGS

FIG. 3 is a block diagram illustrating the components of an example dispenser head.

FIG. 6 is a flow chart illustrating another example process by which a timed dispenser may operate.

DETAILED DESCRIPTION

In general, the disclosure describes a chemical product dispenser that includes one or more timing features. The chemical product may include cleaning, sanitizing, disinfecting, or other chemical products. The chemical product may include any chemical product having a time dependent characteristic, such as a contact time or a cure time. The so-called "timed dispenser" may include any type of chemical product dispenser including spray bottles, aerosol cans, trigger- or pump-actuated dispensers, or other manually operated dispensers. Therefore, it shall be understood that the features disclosed herein are not limited to implementation with any particular type of chemical product dispenser or to the use of cleaning products. The timed dispenser may help to ensure that any type of chemical product has met or exceeded minimum contact, cure, or other required or recommended minimum period of time.

Figure 1:
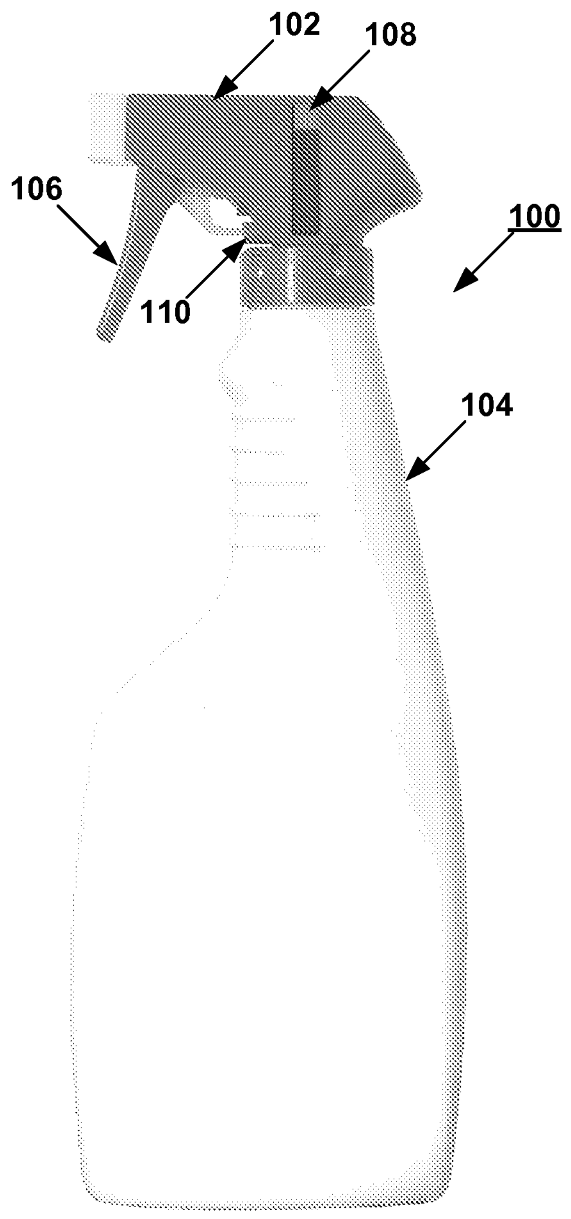
FIG. 1 is a conceptual diagram of an example timed dispenser.

FIG. 1 is a conceptual diagram of an example timed dispenser 100. Timed dispenser 100 includes a dispenser head 102 through which the chemical product is dispensed and a reservoir 104 that contains some volume of the chemical product. Dispenser head 102 may include a trigger mechanism 106, one or more indicators 108, and an actuation sensor 110. In some configurations, one or more of trigger 106, indicator 108, and actuation sensor 110 may be mounted on other locations of dispenser 100 other than dispenser head 102, and it shall be understood that the disclosure is not limited in this respect.

In this example, timed dispenser 100 is depicted as a generic spray bottle. Reservoir 104 may hold a cleaning agent or other chemical product to be dispensed. The chemical product is dispensed through manual actuation of the trigger mechanism 106. Actuation of trigger 106 may initiate the dispensing of chemical product through dispenser head 102. Trigger 106 may comprise the lever arm of a pump. In other examples trigger 106 may be a valve actuator, switch, pressurizing pump, aerosol spray pump, or other means of accomplishing dispensation of the chemical product through the dispenser head 102 or through another dispensing mechanism. Trigger 106 may be actuated multiple times in a single trigger event, e.g. trigger 106 may be squeezed multiple times to dispense a sufficient amount of the product to cover a particular area or accomplish a particular task.

Multiple timed dispensers 100 using a variety of cleaning agents or other chemical products may be used. Timed dispenser 100 is depicted as a manual spray pump, but in other examples may comprise other methods of dispensing product, e.g. aerosol, electrical, etc. Dispenser head 102 may include a timing module, e.g. timing module 130 (FIG. 2) and power supply (not shown). The timing module and power supply may be built into dispenser head 102. Dispenser head 102 may also include one or more indicators 108, which may alert a user when a contact time or other time dependent characteristic has elapsed.

Trigger mechanism 106 may cause dispenser head 102 to dispense a cleaning agent or other product. Trigger mechanism 106 may comprise the lever arm of a pump. In other examples trigger mechanism 106 may be a valve actuator, switch, or other means of activating dispenser 100. Trigger 106 may be actuated multiple times in a single trigger event, e.g. trigger 106 may be squeezed multiple times to dispense a sufficient amount of cleaning agent to cover a particular area.

Actuation sensor 110 detects actuation of trigger mechanism 106. Actuation sensor 110 may be physically coupled to trigger mechanism 106. For example, actuation sensor 110 may comprise a flex sensor, reed switch, hall effect sensor, or other sensor configured to detect actuation of trigger mechanism 106. In other examples, actuation sensor 106 may be physically separate from trigger 106 and rely on other means to detect the actuation of trigger 106. For example, actuation sensor 106 may detect a voltage change associated with powering a pump in an electric sprayer or sense a pressure change associated with dispensing a cleaning agent or other product through dispenser head 102. It shall be understood that the disclosure is not limited with respect to the particular mechanism which causes chemical product to be dispensed, or to the particular actuation sensor used.

Actuation sensor 110 may provide an actuation signal indicative of actuation of the trigger mechanism 106. The actuation signal may also indirectly indicate dispensation of the product. Actuation sensor 110 may provide an actuation signal for each actuation of trigger 106. The actuation signal may allow the number of dispenser actuations to be counted. The actuation signal may also initiate the measurement of one or more predetermined period(s) of time after dispensing of the product. In some examples, actuation signal data may be used to monitor the adequacy and/or thoroughness of cleaning procedures. In other examples, the data may be used to help maintain an inventory of the products dispensed by providing a count of the number of dispensations and/or a measure of the amount of product dispensed.

Indicator 108 may include, for example, a counter or timer configured to provide a visual indication of the time elapsed from the actuation of trigger 106. In other examples, indicator 108 may present an alert, for example a flashing LED or audible signal, when one or more predetermined period(s) of time have elapsed after a dispenser actuation. The predetermined period(s) of time may be preprogrammed into timed dispenser 100 or may be adjusted, allowing timed dispenser 100 to accommodate a range of products with different time dependent characteristics. Indicator 108 is depicted in FIG. 1 as a LCD progress bar, but may also be implemented as an LED, audible or vibrating alarms, a LCD counter, or other similar indicator mechanisms or combinations of mechanisms. Indicator 108 may also provide an alert associated with other circumstances. For example, indicator(s) 108 may provide an alert when trigger 106 has not been depressed a predetermined number of times corresponding to adequate volume of chemical product dispensed, adequate cleaning of a surface and/or adequate cleaning of a room, etc. As another example, indicator(s) 108 may present an alert when one or more predetermined periods of time corresponding to dispensation of one or more corresponding predetermined amount(s) of product have elapsed. As another example, indicator(s) 108 may provide an alert when an actuator has not been depressed for a sufficient period of time corresponding to adequate volume of chemical product dispensed, adequate cleaning of a surface, adequate cleaning of a room, and/or adequate cleaning of a desired area to be cleaned, etc.

Figure 2:
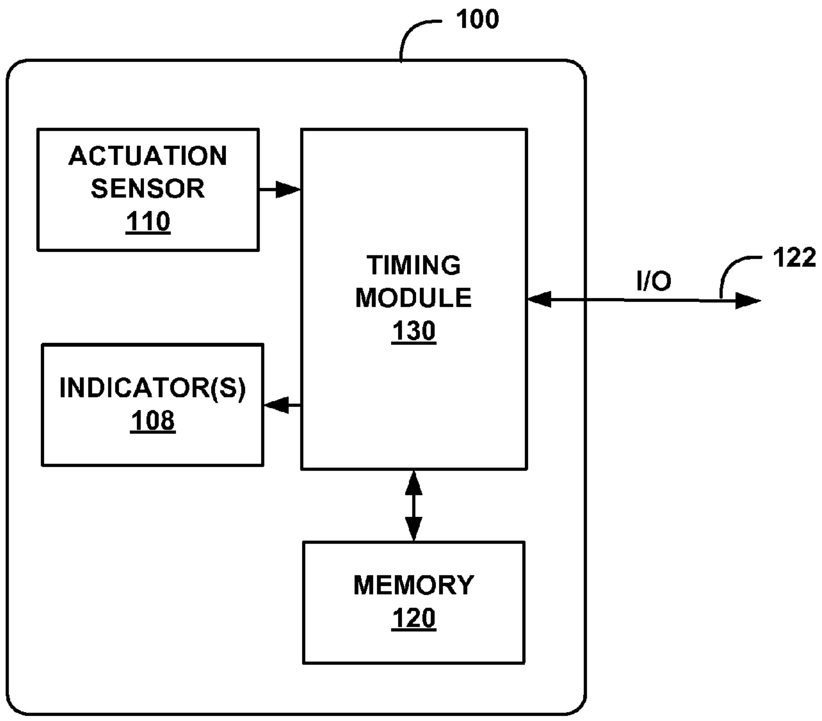
FIG. 2 is a block diagram illustrating electronic components of an example timed dispenser.

FIG. 2 is a block diagram illustrating electronic components of an example timed dispenser 100. As mentioned above, timed dispenser 100 may include an actuation sensor 110 that senses actuation of a trigger or other dispense initiation mechanism, a timing module 130, and one or more indicators 108. Timed dispenser may also include a memory or other storage medium 120. In some examples, timed dispenser 100 may include a power source, such as a battery (not shown), to power one or more of the electronic components.

In some examples, mechanical energy produced through actuation of the trigger may be converted to electrical energy in ways known in the art to power one or more of the electronic components or to charge a battery. For example, a generator or other device may be used to convert mechanical energy into electrical energy may be used. The source of the mechanical energy may be manual actuation of the trigger or other actuator, fluid moving through the dispenser as it is being dispensed, or any other source of mechanical energy utilized during dispensation of the chemical product.

Actuation sensor 110 is configured to detect actuation of trigger 106 and generate a corresponding dispenser actuation signal. The dispenser actuation signal is received by timing module 130. In one example, receipt of the dispenser actuation signal may cause timing module 130 to initiate measurement of one or more predetermined time period(s). As another example, timing module 130 may use the dispenser actuation signals to count the number of dispenser actuations for the timed dispenser.

Actuation sensor 110 may detect the actuation of trigger 106 in any of a number of ways. For example, actuation sensor 110 may detect the mechanical motion of trigger. In other examples, actuation sensor 110 may detect electrical activity in response to actuation of trigger 106 or detect the flow or pressure of product as the product is being dispensed after actuation of trigger 106. Actuation sensor 110 may provide an actuation signal each time the trigger is actuated, allowing the number of dispenser actuations to be determined. In some examples, actuation sensor 110 may measure the duration of the actuation of trigger 106, providing a further measure of the amount of product dispensed.

Timing module 130 may be implemented using one or more of a digital clock, a countdown timer, a counter, a time delay circuit, a processor, a microcontroller, or other device capable of measuring one or more periods of time. When timing module 130 determines that one or more predetermined period(s) of time have elapsed, timing module 130 may activate indicator 108. In some examples, timing module 130 may be reprogrammable, allowing a user or another device to adjust the one or more predetermined period(s) of time to correspond to other chemical products.

In some examples, timing module 130 may restart the measurement of time after each actuation of trigger 106. By restarting the measurement of time after each dispenser actuation, the predetermined period of time would be measured from the most recent dispenser actuation. In this example, each actuation of the sprayer re-starts the timer such that the last actuation indicates the start of the minimum contact time required by the product in use. In this way, when multiple actuations of the trigger are performed closely together to cover one or more surfaces to be cleaned, expiration of the minimum contact time (or other time dependent characteristic) will be determined from the last dispenser actuation.

Timing module 130 may further be configured to measure a trigger event time window to consolidate multiple dispenser actuations occurring within the trigger event time window into a single "trigger event." Timing module 130 may measure the trigger event time window beginning with an initial trigger activation and treat all dispenser actuations occurring within the trigger event time window as a single trigger event, measuring the contact time or other time dependent characteristic from the most recent dispenser actuation. Timing module 130 may also count the number of dispenser actuations occurring within the trigger event. For example, timing module 130 may require a preset number of actuations of trigger 106 for each trigger event. If the user fails to actuate trigger 106 a sufficient number of times to meet or exceed the preset number, timing module 130 may activate one or more of indicators 108 to provide an alert to the user of the failure.

Indicator(s) 108 may be configured to indicate when one or more predetermined period(s) of time have elapsed after the actuation of trigger. For example, indicator(s) 108 may include an audible or visual alert, such as a flashing LED or audible signal. In other examples, indicator(s) 108 may comprise an LCD progress bar, vibrating alarms, an LCD counter, or other similar mechanisms or combinations of mechanisms. Indicator(s) 108 may also provide other alerts. For example, an alert may be provided when trigger 106 has not been depressed a sufficient number of times for adequate cleaning of a surface in a single trigger event. These other alerts may be the same or different than the alert provided for the lapse of a predetermined period of time from a dispenser actuation or trigger event.

Timing module may store data regarding each dispenser actuation, such as a log of dispenser actuations and associated time and date stamps, total number of dispenser actuations, and/or other relevant data in a memory or other data storage device 120. This data will be referred to herein collectively as "actuation data." The actuation data may include timed dispenser identification information that identifies the particular timed dispenser that the actuation data is associated with. The actuation data may be communicated to one or more external devices such as a computer, cell phone, personal digital assistant, docking station, base station, etc., via one or more Input/Output (I/O) line(s) 122. In addition, I/O line(s) 122 may also permit timing module 130 to be re-programmed or re-configured by one or more external device. Rather than a hardwired I/O line 122, timed dispenser may be configured to communicate wirelessly, or through any combination of wired or wireless communication.

Figure 3:
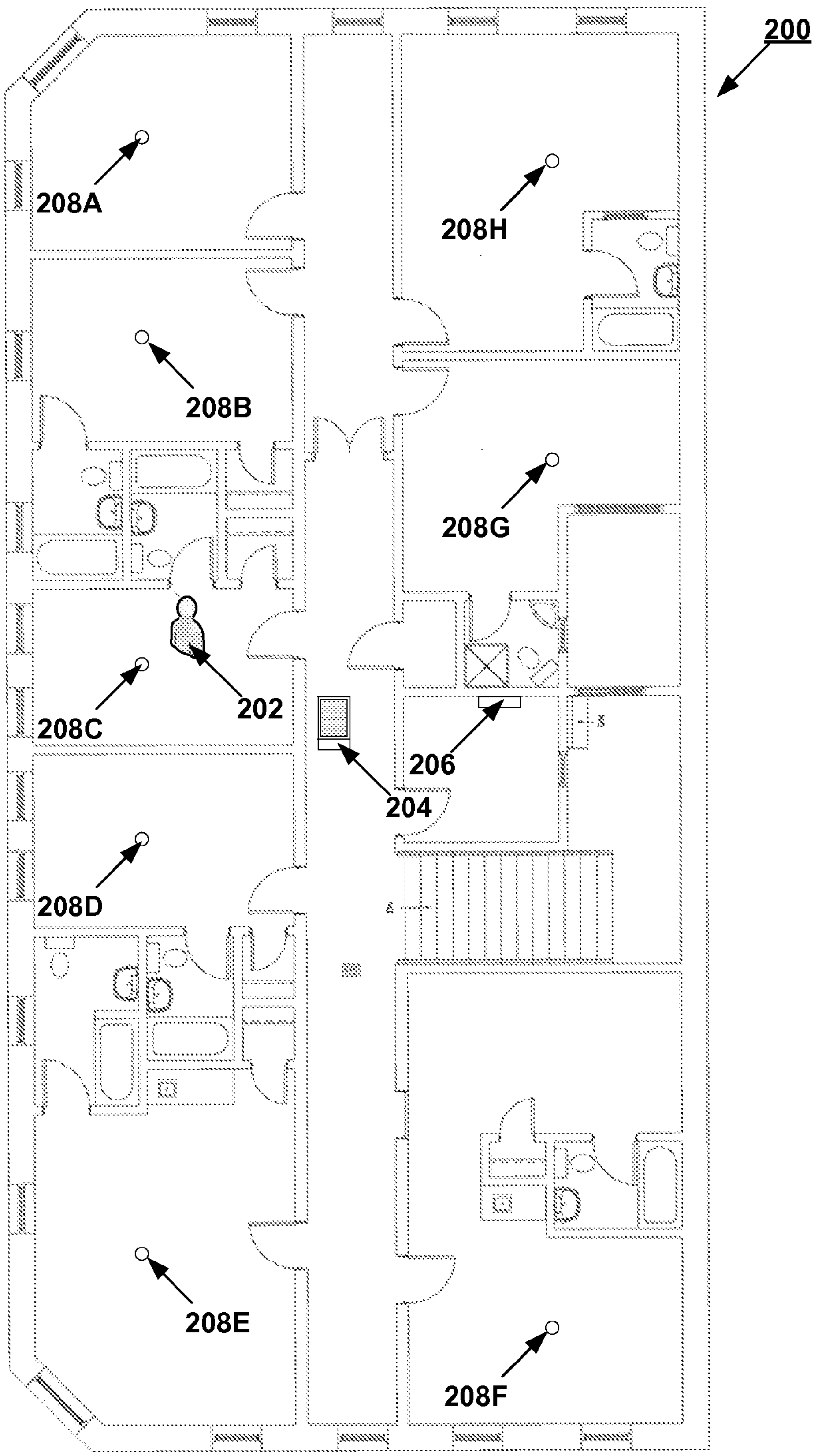
FIG. 3 is a conceptual diagram illustrating an example facility in which a timed dispenser such as that shown in FIG. 1 may be used.

FIG. 3 is a conceptual diagram illustrating an example facility 200 in which one of more timed dispensers 100 may be used. Facility 200 may include any type of commercial facility in which cleaning activities are conducted, including hotels, restaurants, healthcare facilities, residential facilities, public spaces, food processing facilities, etc. Facility may also include a person's home, business, or other area to be cleaned. Although the general case of a facility cleaned by housekeeping staff will be described herein, it shall be understood that the disclosure is not limited in this respect.

Facility 200 may be cleaned by housekeeping staff, such as housekeeper 202 using a dispenser such as dispenser 100 shown in FIG. 1. A mobile cleaning station 204, such as a janitorial or housekeeping cart, may be used to store cleaning or other chemical products, product dispensers, and other equipment necessary to clean facility 200. Mobile cleaning station 204 may also include a docking station, e.g. docking station 500 (FIG. 5), to allow the dispenser or dispenser head to communicate with an external computing device, such as base station 206 or other computing device.

Certain cleaning, sanitizing, disinfecting, or other chemical products may have a minimum contact time or some other time dependent characteristic required for proper and effective use. For example, certain chemical products require a minimum contact time in order to ensure that various microorganisms living on the surface are destroyed. A timed dispenser such as timed dispenser 100 may help ensure that the chemical product is not wiped away or otherwise removed before the contact time has elapsed by providing, for example, an audible or visual indication when the contact time has elapsed.

In addition, certain cleaning, sanitizing, disinfecting, or other chemical products require a minimum volume of product to be dispensed for proper and effective use. Failure to dispense the minimum volume of product may result in an alert indicating that insufficient product was applied to the surface. A timed dispenser such as timed dispenser 100 may help ensure that sufficient volume of the chemical product is applied by providing, for example, an audible or visual indication when sufficient chemical product has been applied. The timed dispenser may determine whether an adequate volume has been applied by counting the number of dispenser actuations and multiplying that by an amount dispensed per actuation (such amount being previously known or calibrated) or by measuring the length of time that the dispenser is actuated (such as with electronic or other dispensers that may be actuated for any length of time) and multiplying that by an amount dispensed per unit time (such amount also being previously known or calibrated).

A supervisory authority, e.g. housekeeping or facility management, may use actuation data collected with respect to use of the timed dispenser to monitor use of the cleaning or other chemical products, to monitor and/or determine whether sufficient quantities of chemical product have been dispensed during each use and/or over time, to determine quantities of chemical products used during each use and/or over time, to maintain an inventory of the chemical products used, and/or to help maintain an inventory of chemical products remaining.

In some examples, timed dispenser 100 may include a locator feature. In this example, timed dispenser 100 may interact with one or more locator units 208 positioned throughout the facility. This may permit the location within the facility of each timed dispenser 100 possessing the locator feature to be determined. The timed dispenser 100 may store location information along with the actuation data, time and date stamp for each timed dispenser actuation. Such location data may be communicated along with the actuation data to a base station or other computing device. Alternatively, the location information and/or actuation data may be communicated from the locator units 208 to a base station or other computing device.

One or more base station(s) 206 or other local computer may be configured to receive timed dispenser data from one or more timed dispensers 100. Communication between the base station(s) 206 and the timed dispenser(s) 100 may be wired or wireless. Base station 206 may monitor the use of one or more timed dispenser(s) and generate one or more reports detailing at least one characteristic of use. Base station 206 may communicate directly with timed dispenser(s) 100, or may communicate indirectly with the timed dispenser(s) 100, such as through one or more docking stations 204, computers, or other electronic devices. The base station 206 may receive the actuation data corresponding to each timed dispenser, including timed dispenser identification information, the number of actuations for each timed dispenser, the time and date information associated with each dispenser actuation, the location information associated with dispenser actuations, the amount of time each dispenser spent at particular location, and/or the volume of product dispensed by each timed dispenser, and/or any other relevant actuation data.

Figure 4:
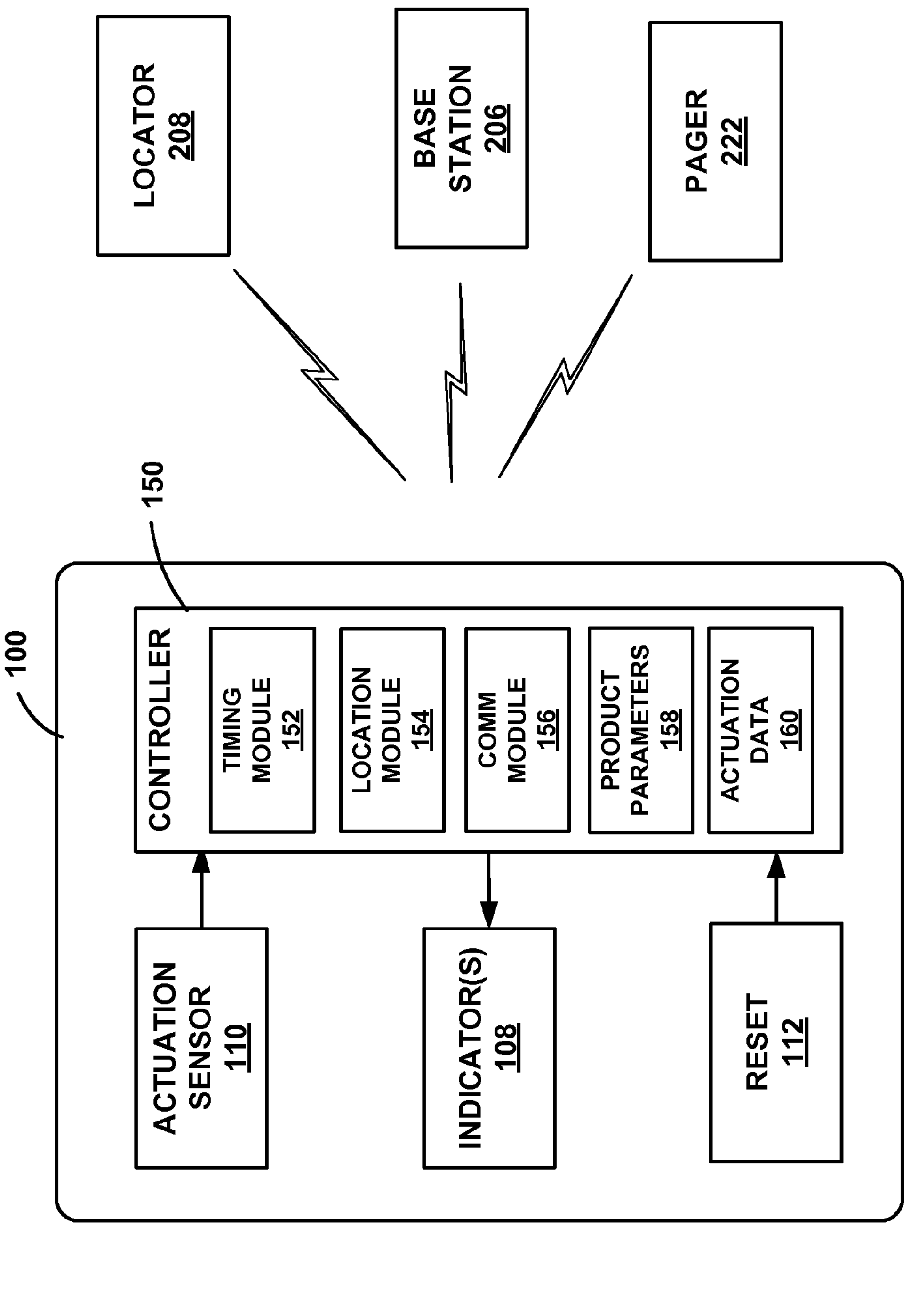
FIG. 4 is a block diagram illustrating an example communications environment within which one or more timed dispensers may be used.

FIG. 4 is a block diagram illustrating another example of a timed dispenser 100 and an example communications environment within which one or more timed dispensers 100 may be used. In this example, timed dispenser 100 includes an actuation sensor 110, indicator(s) 108, and a controller 150. Controller 150 may include one or more processing elements, data storage, and one or more software modules which control the various operations of timed dispenser 100. For example, controller 150 includes a timing module 152, a location module 154, and a communication module 156. Controller 150 also includes storage of product parameters 158 and actuation data 160.

Product parameters 158 may include, for example, data such as chemical product contact time(s) or other product time dependent characteristics for one or more chemical products, target dispense counts, target dispense volumes, and/or trigger event thresholds, or other product parameters that may be relevant to cleaning processes. One or more of these product parameters 158 may be reprogrammable so that new or updated product information may be uploaded to timed dispenser 100. Actuation data 160 may include, for example, a log of dispenser actuations and associated time and date stamps, dispenser actuation counts, time and date stamps, durations, locations, and/or times, as well as other relevant dispenser actuation data.

Timing module 152 includes software that controls operation of the timing features of timed dispenser 100. For example, receipt of an actuation signal from actuation sensor 110 may cause controller 150, under control of timing module 152, to initiate measurement of one or more predetermined periods of time. Communication module 156 may be configured to permit time dispenser 100 to communicate with one or more of locator units 208, base stations 206, docking stations, computers, personal digital assistants, mobile phones, etc. The communication may be wired, wireless, or any combination of both. Location module 145 may permit timed dispenser 100 to determine its general or specific location within the facility based on the communication with one or more locators 208.

Timed dispenser 100 may also communicate with a pager 222. Pager 222 may be worn by or otherwise associated with a user. Pager 222 may provide one or more visual, audible, or tactile, e.g. vibrating, alerts corresponding to the alert signals provided by indicator 108. For example, upon the determination of a condition warranting alerting the user (e.g., to alert a user that a predetermined period of time corresponding to cleaning of a surface, a room, or other area to be cleaned has elapsed), controller 150 may cause communication module 156 to transmit a corresponding signal to pager 222. Pager 222 may allow the user of timed dispenser 100 to continue their activities without requiring direct monitoring of indicator(s) 108.

In a hotel, hospital, or other facility in which rooms or other defined areas are cleaned, it may be known how long it “should” take a clean a given area. In addition, it may also be known how many trigger actuations it should take to clean a given area. The locating ability providing in some examples of the timed dispenser system described herein may permit housekeeping management to track how long a given dispenser is in a given location, and also track how many trigger actuations occurred in a given location.

As another example, in systems that do not utilize locating ability, timed dispenser may include a reset 112. Reset 112 may be used for various purposes. For example, in systems with timed dispenser locating ability, a user may actuate reset 112 when moving from one room/area within a facility to another room/area within a facility. This may permit housekeeping management to track how long a given dispenser is in a given location (e.g., how long between resets), and also track how many trigger actuations occurred in a given location (by counting trigger actuations between resets.

Figure 5:
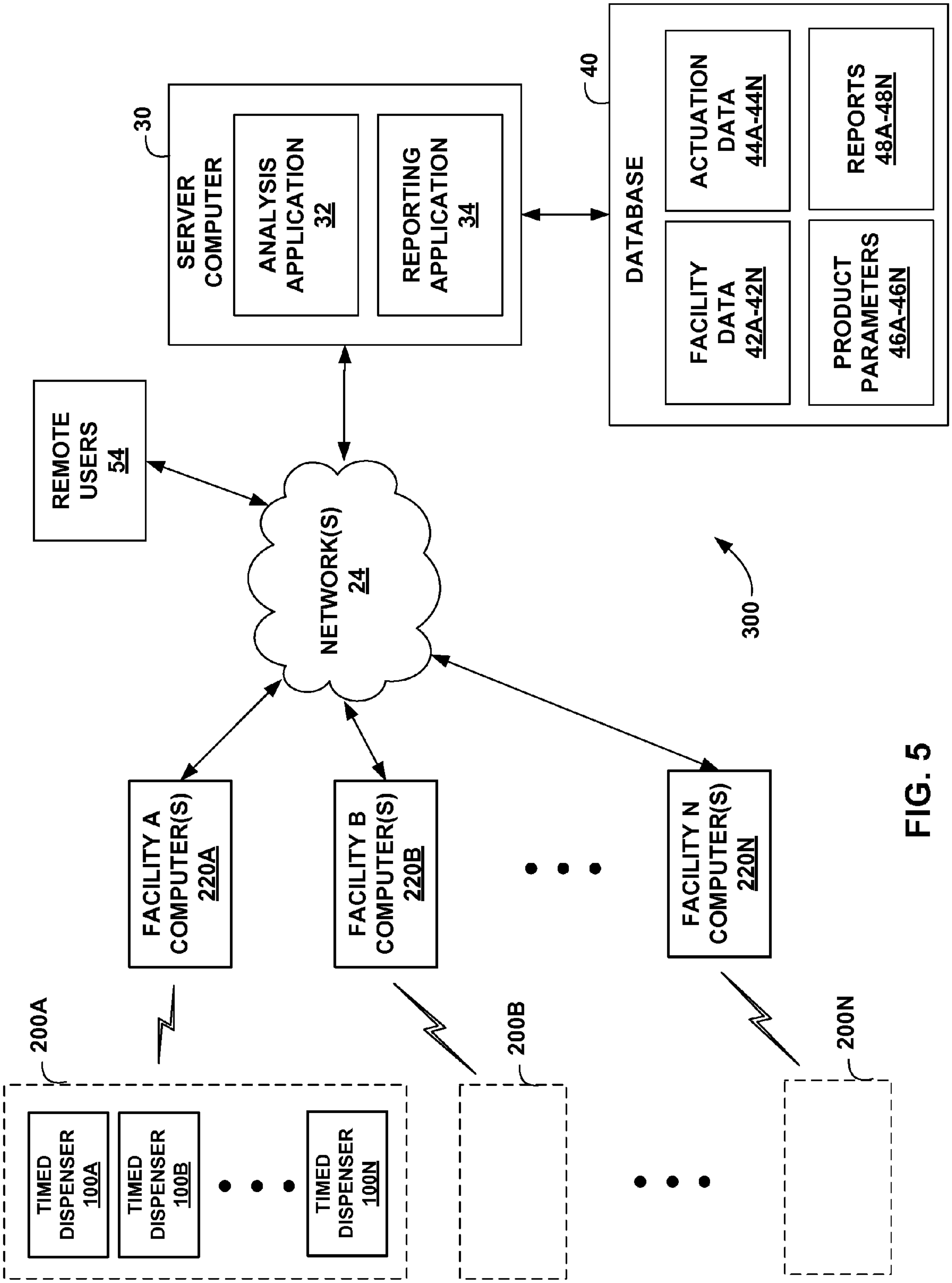
FIG. 5 is a block diagram illustrating another example communications environment within which one or more timed dispensers may be used.

FIG. 5 is a block diagram illustrating an example timed dispenser audit system 300. One or more timed dispensers 100A-100N associated with each facility 200A-200N communicate with one or more facility computer(s) 220A-220N, respectively. FIG. 5 shows timed dispensers 100A-100N associated with facility A computer(s) 220A. Facility 200B would include an associated group of one or more timed dispensers and so on up to facility 200N. Facility computer(s) 220A-220N may include one or more base stations, facility mainframe computers, laptop computers, personal digital assistants, mobile phones, or other device capable of electronic communication. Each timed dispenser 100A-100N may communicate with the same or different facility computer(s) 220. The facility computers 220A-220N are coupled via network(s) 24 to one or more server computers 30. Network(s) 24 may include, for example, one or more of a dial-up connection, a local area network (LAN), a wide area network (WAN), the internet, a cell phone network, satellite communication, or other means of wired or wireless electronic communication.

The facility computer(s) 220A-220N receive actuation data associated with each timed dispenser associated with that facility and communicate the actuation data to the one or more server computers 30. Server computer 30 may also send commands, instructions, software updates, etc. to each facility computer 220A-220N via network(s) 24. Server computer 30 may receive data or otherwise communicate with the facility computers 220A-220N on a periodic basis, in real-time, upon request of server computer 30, or at any other appropriate time.

The data received from the facility computers 220A-220N, as well as other data associated with the operation of timed dispenser audit system, may be stored on a database 40. Database 40 may store, for example, facility data 42A-42N, actuation data 42A-42N, product parameters 46A-46N, and/or reports 48A-48N. Facility data 42A-42N may include data associated with each facility 200A-200N, such facility identification information, facility location information, the number of timed dispenser at the facility, a list of chemical products used at the facility, target chemical product usage characteristics at the facility, and/or other relevant facility information. Product parameters 46A-46N may include target product parameters. The product parameters may be generalized or they may be specific to a particular facility. Actuation data 44A-44N includes actuation data associated with each facility 200A-200N, respectively. Reports 48A-48N includes any reports generated that are specific to each facility 200A-200N, respectively.

Server computer 30 includes an analysis application 32 that analyzes the actuation data received from each of facilities 200A-200N and stores the results for each facility 200A-200N in the database 40. Analysis application 32 may analyze one or more of the actuation data 44A-44N, facility data 42A-42N, product parameters 46A-46N, and/or other relevant data either alone or in various combinations with each other to monitor timed dispenser usage and/or to characterize timed dispenser usage based on analysis of the actuation data. The data may be analyzed by individual timed dispenser, type of chemical product dispensed, individual facility, grouping(s) of related facilities (e.g., groupings of multiple facilities that are commonly owned), grouping(s) of similar facilities (e.g., groupings of multiple facilities of similar size or type), or by various other selected parameters.

A reporting application 34 generates a variety of reports that present the analyzed data for use by the person(s) responsible for overseeing timed dispenser usage. Reporting application 34 may, for example, generate reports that characterize timed dispenser usage based on analysis of one or more of the actuation data 44A-44N, facility data 42A-42N, product parameters 46A-46N, and/or other relevant data. Reporting application 34 may generate a variety of reports to provide users local to each facility 200A-200N or to remote users 54 with both qualitative and quantitative data regarding timed dispenser usage at one or more facilities, and/or to compare data over time to determine whether changes have occurred. Reporting application 34 may also users to benchmark timed dispenser usage at multiple facilities.

For example, analysis application 32 may determine and/or reporting application 34 may generate one or more reports characterizing whether sufficient dispenser actuations were performed during a predetermined period of time to clean a defined area. As another example, the reporting application 34 may generate one or more reports characterizing whether sufficient chemical product was dispensed to clean a defined area. Analysis application 32 may determine and/or reporting application 34 may generate one or more reports characterizing the locations within a facility of one or more of the plurality of timed dispensers and associated actuation data. In addition, the reporting application 34 may generate one or more reports indicating a cleanliness level for one or more rooms or defined areas within the facility. For example, the analysis application 32 may determined whether one or more areas were "clean" or "not clean" based on the actuation data received from one or more of the plurality of timed dispensers, and/or the reporting application 34 may generate corresponding reports. For example, if a timed dispenser was actuated an insufficient number of times, analysis application 32 may determine that the room or area was not cleaned adequately, and a corresponding report may be generated indicating one or more of the room/area at issue, the date and/or time, the associated timed dispenser, and relevant actuation data. It shall be understood that the data may be analyzed in many different ways, and that many different types of reports that present the raw and/or analyzed data in multiple ways may be generated, and that the disclosure is not limited in this respect.

Reports 48A-48N associated with each facility 200A-200N, respectively, may be stored in database 40. Reports 48A-48N may be accessed by users local to each facility 200A-200N or by remote users 54 over one or more network(s) 24. One or more of the reports 48A-48N may be downloaded and stored on one or more facility computers, user computer 54, other authorized computing device, printed out in hard copy or further communicated to others as desired.

Figure 6:
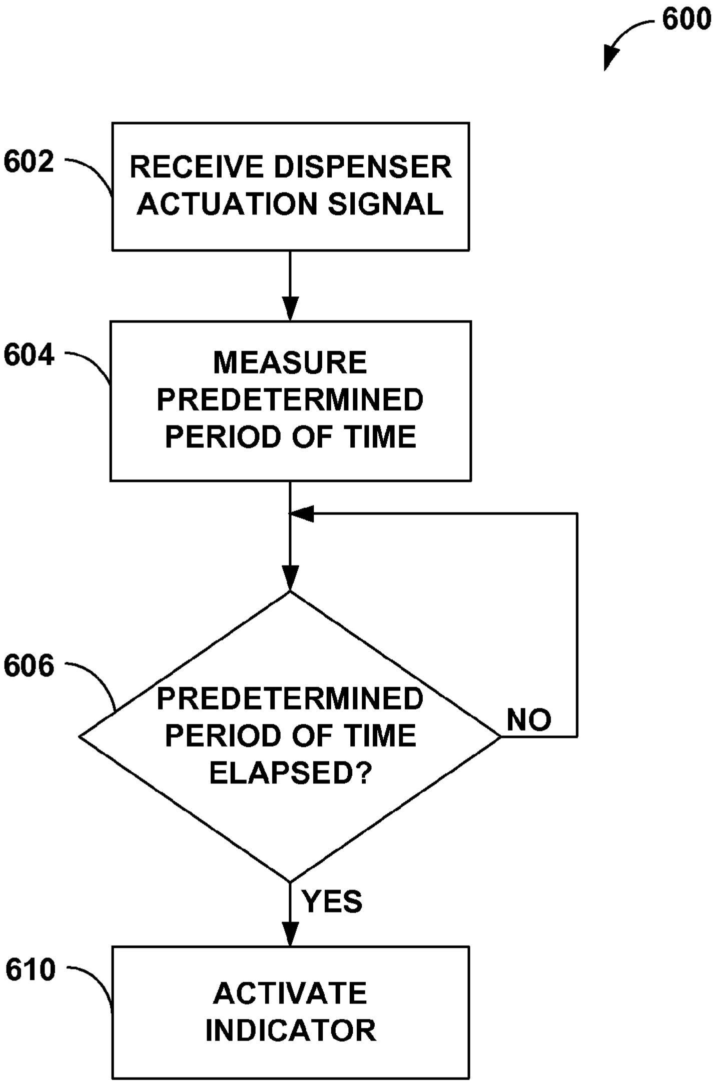
FIG. 6 is a flow chart illustrating an example process by which a timed dispenser may operate.

FIG. 6 is a flow chart illustrating an example process (600) by which a timed dispenser may operate. A timing module or controller of the timed dispenser receives an actuation signal from actuation sensor (such as actuation sensor 110 in FIG. 2 or 4) (602). Upon receipt of the dispenser actuation signal, timed dispenser may start measuring one or more predetermined period of time (604). For example, timed dispenser may start a counter or timer that measures a predetermined contact time for a particular chemical product being dispensed. Timed dispenser determine whether the predetermined period of time have elapsed (606). If not, the timed dispenser continues to wait. When the one or more predetermined periods of time have elapsed (606) the timed dispenser activates the indicator relevant to the particular predetermined period of time (610). For example, when the predetermined contact time has elapsed, time dispenser may activate an indicator corresponding to completion of the predetermined contact time.

Figure 7:
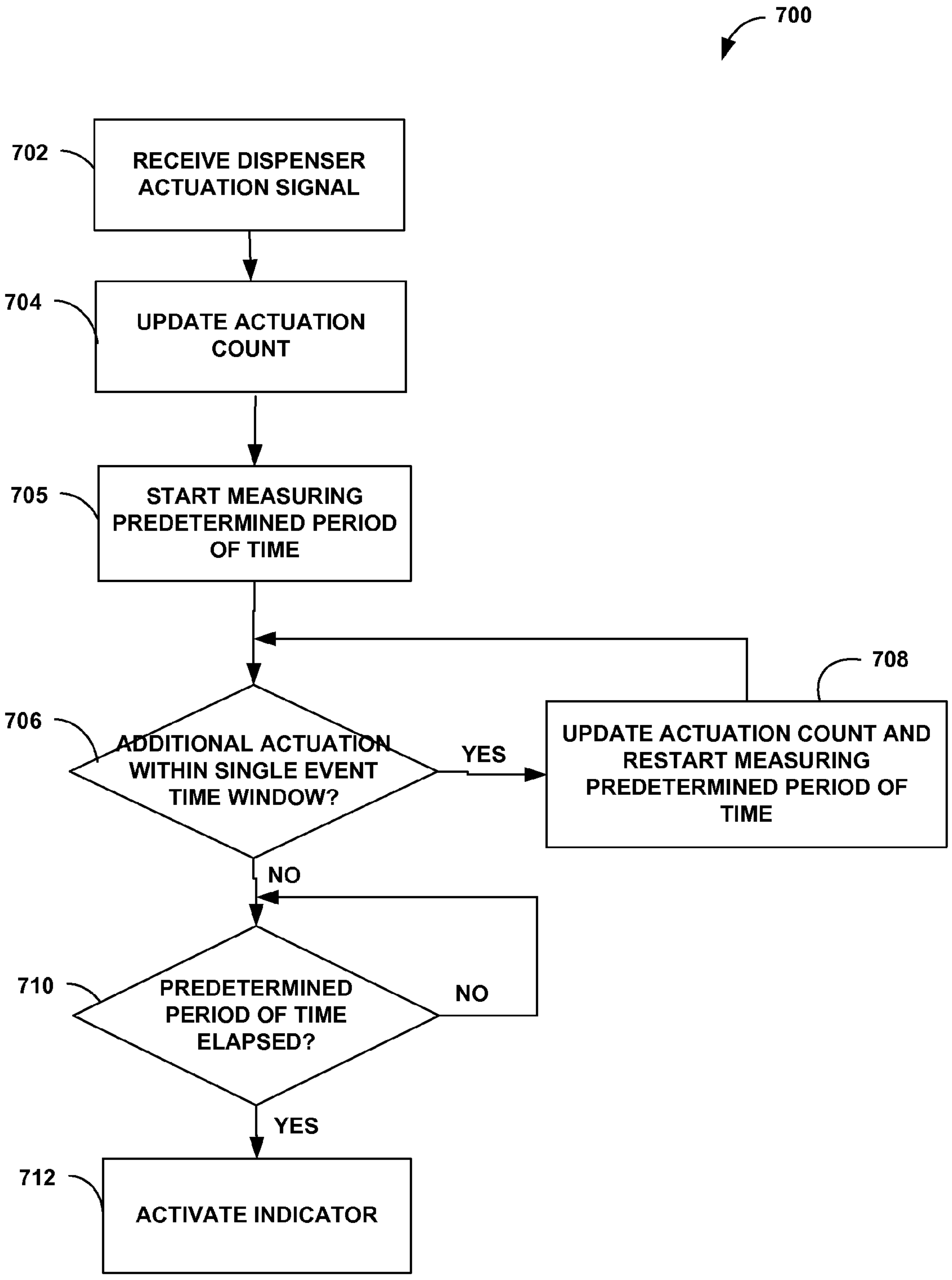

FIG. 7 is a flow chart illustrating another example process (700) by which a timed dispenser may operate. A timing module or controller of the timed dispenser receives an actuation signal from actuation sensor (such as actuation sensor 110 in FIG. 2 or 4) (702). Upon receipt of the dispenser actuation signal, timed dispenser may update an actuation count (704) and may start measuring one or more predetermined period of time (705). For example, timed dispenser may start a counter or timer that measures a predetermined contact time for a particular chemical product being dispensed. Timed dispenser may determine whether one or more additional dispenser actuations occurred within a single event time window (706). If so, timed dispenser may update the actuation count and restart measurement of the one or more predetermined periods of time (708). If additional dispenser actuations did not occur (706), timed dispenser may determine whether the predetermined period of time have elapsed (710). If not, the timed dispenser continues to wait. When the one or more predetermined periods of time have elapsed (710) the timed dispenser activates the indicator relevant to the particular predetermined period of time (712). For example, when the predetermined contact time has elapsed, time dispenser may activate an indicator corresponding to completion of the predetermined contact time.

Figure 8:
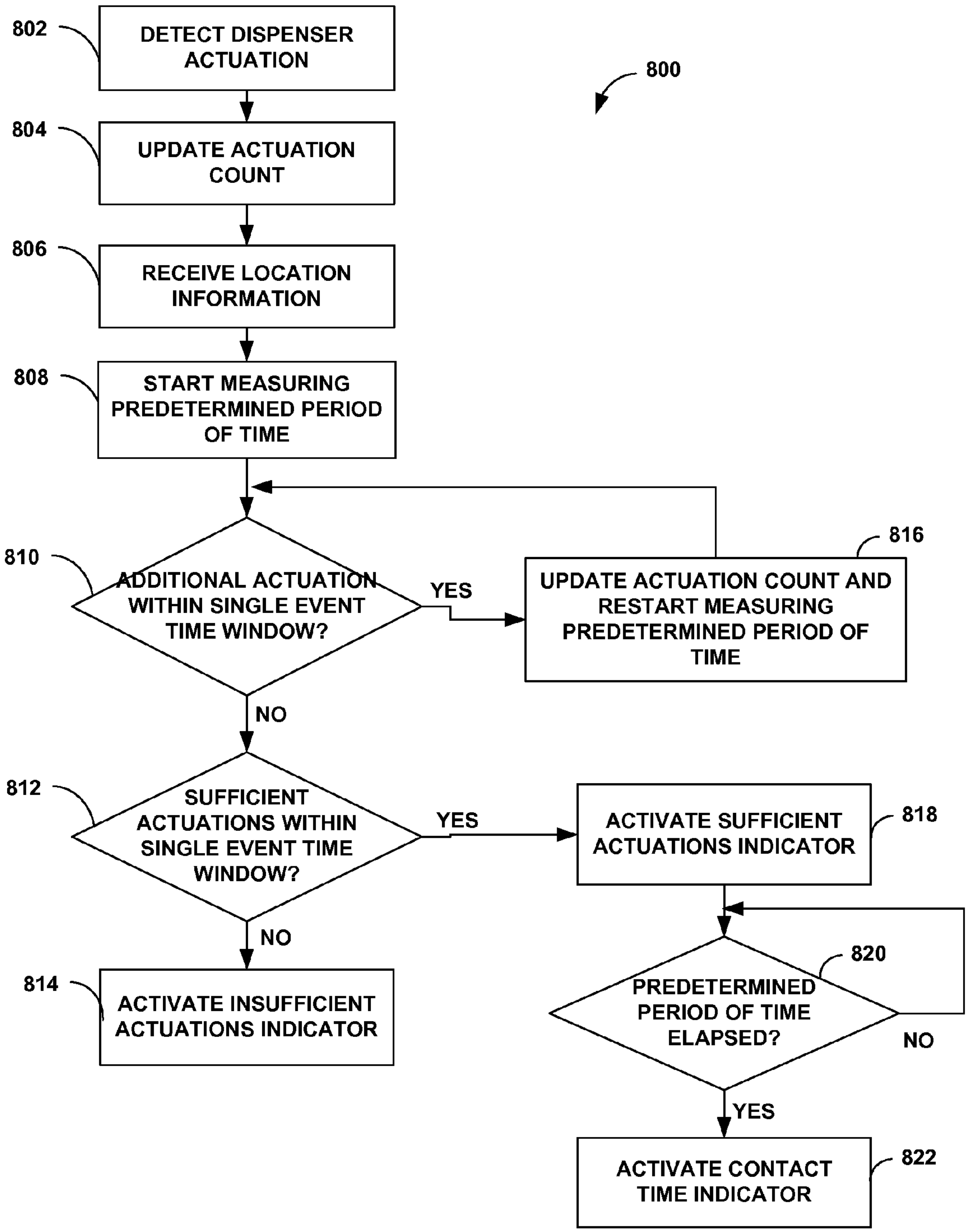
FIG. 8 is a flow chart illustrating another example process by which a timed dispenser may operate.

FIG. 8 is a flow chart illustrating another example process (800) by which a timed dispenser may operate. A timing module or controller of the timed dispenser receives an actuation signal from actuation sensor (such as actuation sensor 110 in FIG. 2 or 4) (802). Upon receipt of the dispenser actuation signal, timed dispenser may update an actuation count (804). Timed dispenser may also receive location information from one or more locator units positioned throughout the facility (806). Upon receipt of the dispenser actuation signal, timed dispenser starts measuring one or more predetermined period of time (808). For example, timed dispenser may start a counter or timer that measures a predetermined contact time for a particular chemical product being dispensed. Timed dispenser may determine whether one or more additional dispenser actuations occurred within a single event time window (810). If so, timed dispenser may update the actuation count and restart measurement of the one or more predetermined periods of time (816). If additional dispenser actuations did not occur (810), timed dispenser may determine whether sufficient actuations occurred within a single event time window (812). If not, timed dispenser may activate an indicator corresponding to insufficient dispenser actuations (814). This may indicate that an insufficient number of dispenser actuations occurred.

If sufficient actuations did occur within a single event time window (812), timed dispenser may activate an indicator corresponding to sufficient dispenser actuations (818). This may indicate that sufficient dispenser actuations occurred.

Timed dispenser may further determine whether the predetermined period of time have elapsed (820). If not, the timed dispenser continues to wait. When the one or more predetermined periods of time have elapsed (820) the timed dispenser activates the indicator relevant to the particular predetermined period of time (822). For example, when the predetermined contact time has elapsed, time dispenser may activate an indicator corresponding to completion of the predetermined contact time. The indicator may utilize distinct indicators or combinations of indicators for separate events.

As discussed above, time dispenser determines whether one or more predetermined periods of time have elapsed. For example, timed dispenser may start a counter or timer that measures a predetermined contact time for a particular chemical product being dispensed. These predetermined period(s) of time may correspond to a contact or cure time for one or more chemical products. In facilities such as hotels, hospitals, or other healthcare facilities, housekeeping staff will commonly apply chemical product to an entire room, such as a bathroom, and then continue cleaning something else while they wait for the contact time to elapse. In the examples described herein, the timed dispenser would be programmed as described herein so that it would not start measuring the predetermined period of time until the last actuation of the timed dispenser. This may help to ensure that the contact time is satisfied for all surfaces on which chemical product is applied, whether that surface was the first surface to receive chemical product or the last.

In addition, oftentimes multiple chemical products, each having different contact or cure times, may be used in a single area to be cleaned. For example, in a hospital or hotel room, multiple sanitizers or disinfectants may be used to clean a bathroom or other area of the room. In such examples, multiple timed dispensers may be used, each associated with and programmed to correspond to the requirements of a different chemical product. A pager, such as pager 222 of FIG. 4, may have multiple indicators each corresponding to a different timed dispenser and hence a different chemical product.

Figure 9:
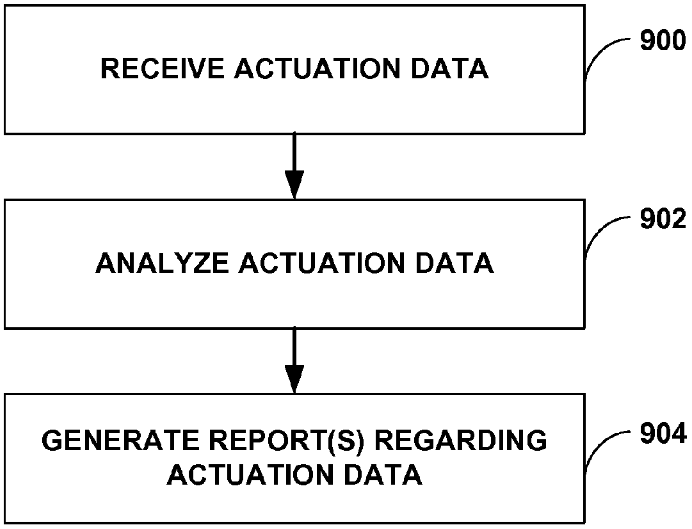
FIG. 9 is a flow chart illustrating an example process by which a facility computer or a server computer may analyze timed dispenser actuation data and generate associated reports.

FIG. 9 is a flow chart illustrating an example process by which a facility computer (such as facility computers 220A-220N) or a server computer (such as server computer 30) may analyze timed dispenser actuation data and generate associated reports. The facility or server computer receives the timed dispenser actuation data (900). In the case of a facility computer, for example, such as facility computers 220A-220N, the timed dispenser actuation data is that actuation data from each of the timed dispensers 100A-100N associated with that facility. In the case of a server computer, for example, the timed dispenser actuation data is that actuation data from the timed dispensers associated with each of facilities 200A-200N. In the latter case, the actuation data may include both timed dispenser identification information and facility identification information.

The facility and/or server computer may analyze the actuation data in various ways (902). For example, the actuation data may be analyzed on an individual timed dispenser basis. As another example, the actuation data for all timed dispensers may be analyzed on a facility-wide basis. As another example, the actuation data for all timed dispensers located at one or more groupings of facilities may be analyzed. The actuation data may be analyzed either alone or in various combinations with the facility data and/or the product parameters to generate further actuation data. The facility and/or server computer may generate reports based on some of all of the analyzed actuation, facility, or product parameter data (48A-48N).

As described herein, various aspects of a timed dispenser and/or timed dispenser audit system may be computer implemented, and as such may be incorporated into computer software or hardware. For example, a computer system may collect and analyze data generated during implementation of the hand hygiene compliance system. This information may be stored and analyzed and reports generated to provide feedback to a facility manager or corporation. Furthermore, the analysis may be performed across multiple accounts, such as multiple accounts within a single corporation or organizational region, to compare, for example, one facility in a corporation with other facilities within the same corporation or to compare like modules of multiple facilities.

The techniques described herein may be implemented in hardware, software, firmware, or any combination thereof. One or more of the techniques described herein may be partially or wholly executed in software. For example, a computer-readable medium may store or otherwise comprise computer-readable instructions, i.e., program code that can be executed by a processor to carry out one of more of the techniques described above. If implemented in software, the techniques may be realized at least in part by a computer-readable medium comprising instructions that, when executed by computer of a hand hygiene compliance system cause the computer to perform one or more of the techniques of this disclosure. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, a magnetic disk or a magnetic tape, a optical disk or magneto-optic disk, CD, CD-ROM, DVD, a holographic medium, or the like. The instructions may be implemented as one or more software modules, which may be executed by themselves or in combination with other software.

The computer-readable instructions may be executed in the computer of the system by one or more processors, general purpose microprocessors, ASICs, FPGAs or other equivalent integrated or discrete logic circuitry.

The instructions and the media are not necessarily associated with any particular computer or other apparatus, but may be carried out by various general-purpose or specialized machines. The instructions may be distributed among two or more media and may be executed by two or more machines. The machines may be coupled to one another directly, or may be coupled through a network, such as a local access network (LAN), or a global network such as the Internet. Accordingly, the term "processor," "controller" or other like terms as used herein may refer to any structure suitable for implementation of the techniques described herein.

Various aspects of the timed dispenser and/or timed dispenser audit system may also be embodied as one or more devices that include logic circuitry to carry out the functions or methods as described herein. The logic circuitry may include a processor that may be programmable for a general purpose or may be dedicated, such as microcontroller, a microprocessor, a Digital Signal Processor (DSP), an Application Specific Integrated Circuit (ASIC), a field programmable gate array (FPGA), and the like.

Various examples have been described. These and other examples are within the scope of the following claims.

The invention claimed is:

1. A system, comprising:

- a plurality of timed dispensers, each of which holds an associated chemical product used during cleaning of a facility, each timed dispenser comprising:
  - a container configured to hold the associated chemical product;
  - a dispense mechanism that when actuated results in dispensation of the associated chemical product from the container;
  - an actuation sensor configured to detect actuation of the dispense mechanism and generate a corresponding dispenser actuation signal;
  - a timing module that receives the dispenser actuation signal and measures a minimum contact time from receipt of the actuation signal;
  - an indicator that is activated under control of the timing module when the minimum contact time has elapsed; and
  - a memory that stores dispenser actuation data, wherein the dispenser actuation data includes a count of dispenser actuations, time and date stamps associated with each dispenser actuation, and timed dispenser identification information; and
- a computing device that receives the dispenser actuation data from each of the plurality of timed dispensers, the computing device comprising:
  - an analysis application that analyzes the dispenser actuation data received from each of the plurality of timed dispensers, and determines whether sufficient dispenser actuations were performed during a predetermined period of time to clean a defined area within the facility; and
  - a reporting application that generates reports that characterize timed dispenser usage based on analysis of the actuation data.

2. The system of claim 1, wherein the timing module includes one of a processor, a counter, a timer, or a controller.

3. The system of claim 1, wherein the timing module is further configured to count a number of dispenser actuations based on a number of received dispenser actuation signals.

4. The system of claim 1, further comprising a memory that stores dispenser actuation data.

5. The system of claim 4 wherein the dispenser actuation data includes one or more of a count of dispenser actuations, time and date stamps associated with each dispenser actuation, and timed dispenser identification information.

6. The system of claim 4, further comprising a communications module that transmits the dispenser actuation data to a computing device.

7. The system of claim 1, further comprising a location module that receives location information associated with a position of the timed dispenser within a facility.

8. The system of claim 1, further comprising a pager that is activated under control of the timing module when the predetermined period of time has elapsed.

9. The system of claim 8 wherein the analysis application analyzes the actuation data to monitor chemical product usage by each of the timed dispensers.

10. The system of claim 1 wherein the reporting application that generates reports that characterize timed dispenser usage based on analysis of the actuation data.

11. The system of claim 1, further comprising a base station that receives actuation data form one or more of the plurality of dispensers and sends the actuation data from the one or more of the plurality of dispensers to the computing device.

12. The system of claim 1, further comprising a docking station positioned on a mobile cleaning station that receives actuation data form one or more of the plurality of dispensers.

13. The system of claim 1, wherein the timed dispenser further comprises a generator that converts mechanical energy generated by actuation of the dispense mechanism into electrical energy.

14. The system of claim 1, wherein the reporting application generates reports characterizing whether sufficient dispenser actuations were performed during a predetermined period of time to clean a defined area within the facility.

15. The system of claim 1, wherein the reporting application generates reports characterizing whether sufficient chemical product was dispensed to clean a defined area within the facility.

16. The system of claim 1, wherein the reporting application generates reports characterizing the locations of one or more of the plurality of timed dispensers and associated actuation data.

17. The system of claim 1, further comprising one or more locator units positioned through a facility that determine timed dispenser location information, and

- wherein the analysis application determines the location of the one or more timed dispensers in the facility based on the timed dispenser location information.

18. The system of claim 1 wherein the analysis application determines whether sufficient amounts of the associated chemical products were dispensed during the predetermined period of time to clean a defined area within the facility.

19. The system of claim 1 wherein the analysis application determines a location within a facility of one or more of the plurality of timed dispensers.

20. The system of claim 1 wherein analysis application 32 determines a cleanliness level for one or more defined areas within a facility based on the actuation data.

21. The system of claim 20 wherein the analysis application determines whether one or more of the defined areas within the facility were "clean" or "not clean" based on the actuation data.

22. The system of claim 1 wherein the reporting application generates reports corresponding to one or more of whether sufficient chemical product was dispensed to clean a defined area, a location within a facility of one or more of the plurality of timed dispensers, a cleanliness level for one or more defined areas within the facility.

* * * * *